United States Patent [19]

Lucero et al.

[11] Patent Number: 4,994,210
[45] Date of Patent: Feb. 19, 1991

[54] HIGH EFFICIENCY DISTRIBUTOR FOR GAS-LIQUID CONTACT COLUMN AND METHOD OF PREPARATION AND USE

[75] Inventors: Bernardo Y. Lucero, Hudson; Gregory A. Carle, Akron, both of Ohio

[73] Assignee: Koch Engineering Company, Inc., Wichita, Kans.

[21] Appl. No.: 487,191

[22] Filed: Mar. 1, 1990

[51] Int. Cl.⁵ .............................................. B01F 3/04
[52] U.S. Cl. .................................. 261/97; 261/110
[58] Field of Search ............................ 261/97, 110, 98

[56] References Cited

U.S. PATENT DOCUMENTS

| 2,535,386 | 12/1950 | Brookins | 261/97 |
|---|---|---|---|
| 2,602,651 | 7/1952 | Cannon | 261/95 |
| 2,670,941 | 3/1954 | Feinberg | 261/97 |
| 3,419,251 | 12/1968 | Eckert | 261/97 |
| 4,171,333 | 10/1979 | Moore | 261/94 |
| 4,557,877 | 12/1985 | Hofstetter | 261/97 |
| 4,729,857 | 3/1988 | Lee et al. | 261/97 |
| 4,816,191 | 3/1989 | Berven et al. | 261/97 |
| 4,855,089 | 8/1989 | Michels | 261/97 |

FOREIGN PATENT DOCUMENTS

| 2945103 | 5/1981 | Fed. Rep. of Germany | 261/97 |
|---|---|---|---|
| 878782 | 10/1961 | United Kingdom | 261/110 |

Primary Examiner—Tim Miles
Attorney, Agent, or Firm—Richard P. Crowley

[57] ABSTRACT

A multiple level distributor and method for the distribution of a downwardly flowing liquid in a gas-liquid contact column and the upward flow of a gas within the gas-liquid column and which distributor comprises a trough type distributor having a plurality of holes therein, the holes arranged in at least two different levels of height from the bottom of the trough type distributor, the number and size of the holes and the height of the holes so arranged to provide for control of the liquid turndown and the liquid flow of the downwardly flowing liquid in the gas-liquid column.

28 Claims, 1 Drawing Sheet

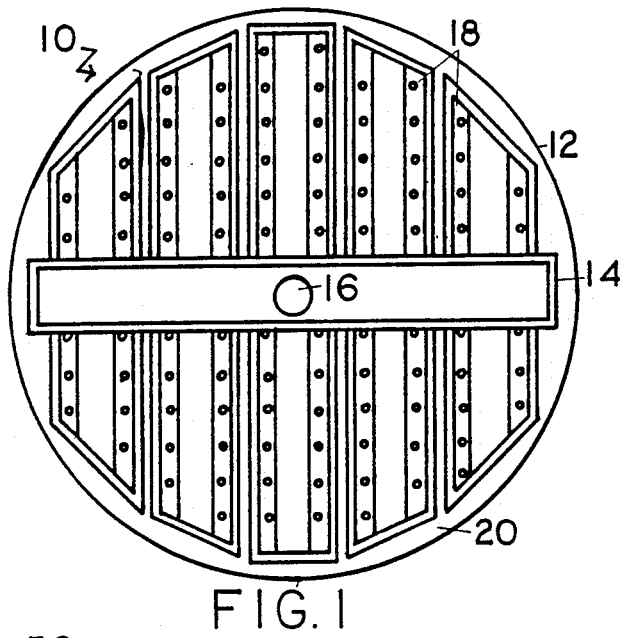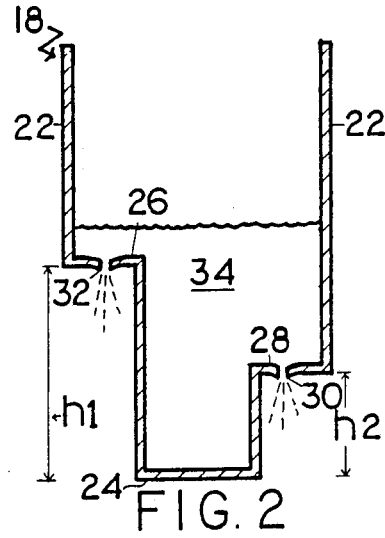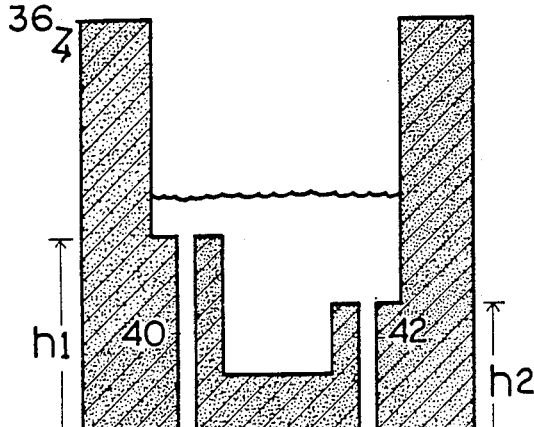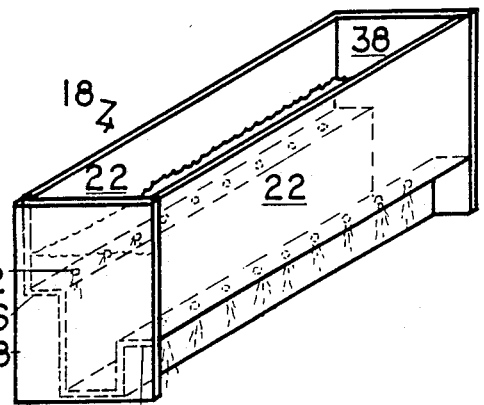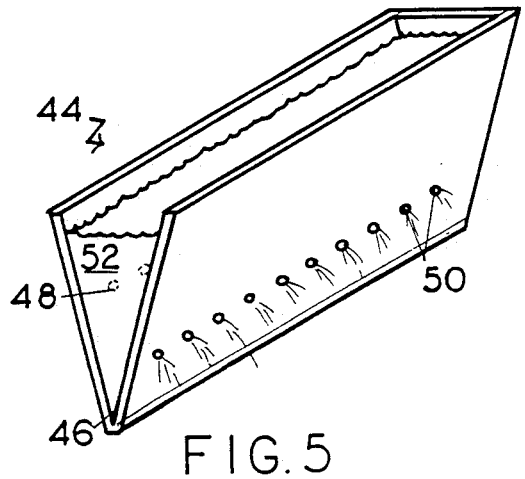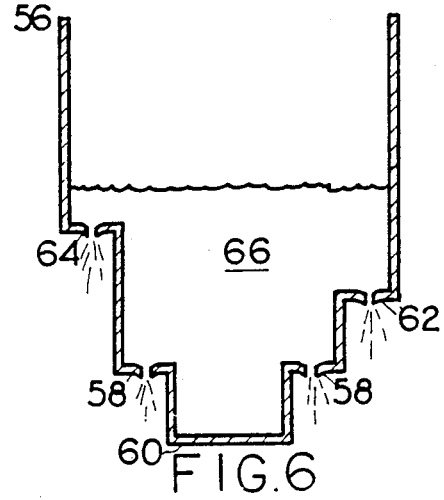

HIGH EFFICIENCY DISTRIBUTOR FOR GAS-LIQUID CONTACT COLUMN AND METHOD OF PREPARATION AND USE

BACKGROUND OF THE INVENTION

Gas-liquid contact columns are employed typically in a wide variety of processes to include, but not limited to: absorption; stripping; scrubbing; distillation and chemical type precesses. Such gas-liquid columns generally contain a main distributor and a plurality of other lower level distributors designed to receive a liquid to be introduced into the upper section of the column and to distribute the liquid more or less uniformly over the entire or substantially the entire cross sectional area of the column in the upper section before the liquid comes into a mass transfer exchange relationship with an upwardly flowing gas in the column. Gas-liquid columns may contain for example a plurality of gas-liquid contacting zones and such zones may comprise packing type materials, either a random or structured type packing or a combination thereof positioned in the column to effect the efficient contact between the upwardly flowing gas and the downwardly flowing liquid.

Liquid distributors often comprise a trough like arrangement or structure usually in a parallel relationship across the cross section of the column and contain overflow channels at a defined level from the bottom of the distributor for liquid to overflow through holes or slots in the vertical wall of the distributor then uniformly over the cross section of the column. Liquid distributors may be made of a variety of materials, depending upon the particular nature of the gas-liquid contact material, and for example, may be prepared of graphite if very corrosive gas-liquids are involved or may be made of fiberglass reinforced plastic or may be formed of ceramics, and more typically, may be comprised of steel, bent or formed into the desired configuration. In particular, liquid distributors may employ a central parting box as a predistributor for liquid which generally extends perpendicular to the other plurality of parallel arranged liquid distributor troughts. Generally, a liquid is fed from a pipe into the predistributor. From the predistributor, the liquid is fed to the plurality of liquid distributors for uniform distribution in the gas-liquid column. For example, one type of distributor employed in gas-liquid columns is described and illustrated in U.S. Pat. No. 4,816,191, issued Mar. 28, 1989, wherein a central trough type distributor to contain liquid contains a plurality of holes positioned in the vertical walls of the trough and spaced apart splash plates with serrated lower edges are provided to aid in the uniform distribution of the overflow liquid from the trough.

It is desirable to provide for high efficiency liquid distributors for use in gas-liquid columns, which distributors may be easily and simply manufactured with a generally standard design at a reduced cost of materials and labor and which distributors are not prone to plugging in use, yet which provide for control of the liquid turndown and the liquid flow rate of the downwardly flowing liquid in the column and which liquid distributor would avoid some of the disadvantges and difficulties associated with the manufacture and use of prior art liquid distributors.

SUMMARY OF THE INVENTION

This invention relates to a high efficiency liquid distributor to control liquid turndown and liquid flow in a gas-liquid column and to gas-liquid columns containing such distributors and to a method of operating said gas-liquid columns and of preparing such liquid distributors.

The invention comprises a high efficiency, trough type liquid distributor for use in a gas-liquid contact column to distribute a downwardly flowing liquid generally uniformly across a cross sectional area of the contact column and to permit the passage of an upwardly flowing gas and which trough distributor comprises a trough liquid distributor means to contain a downwardly flowing liquid therein to be distributed and which trough distributor means comprises a plurality of holes in the liquid distributor means to permit the downward flow of liquid from the trough type distributor and wherein the said holes are arranged on at least two levels, preferably different levels, of height from the lower section of the trough distributor means with the size and number of said holes and the height of the level selected to control the liquid turndown and the liquid flow in the gas-liquid contact column.

The method of the invention comprises introducing a liquid into a gas-liquid contact column, into one or more liquid distributors in the upper section of the column and which method comprises introducing a liquid into a liquid distributor means to contain the downwardly flowing liquid and flowing the liquid downwardly from a plurality of holes in the liquid distribution means, the plurality of holes being generally aligned at two different levels from the bottom of the liquid distribution means, the size and number of holes and the height of the aligned holes from the bottom of the liquid distribution means selected to control the liquid turn over and flow of the liquid from the gas-liquid contact column.

In one embodiment of the invention, the liquid distribution means comprises a multiple stair step liquid distributor for example with two separate stair steps placed on either side of a central liquid distributor trough wherein the stair steps each have a plurality of holes and with the stair steps being at a different height from the bottom of the liquid distributor so as to provide for the downward flow of the liquid from the stair steps, depending on the height of the liquid in the central trough area of the liquid distributor.

The high efficiency stair step type trough distributor of the invention can be prepared in ceramic, graphite, fiberglass reinforced plastics and metal and particularly for example can be milled from a graphite block, extruded from ceramic material or prepared by a lay up of a fiberglass reinforced plastic or be bent and welded from sheet metal material. The liquid distributor of the invention through the plurality of holes at different levels provides the benefit of minimizing plugging where only one series of holes at one level is employed. In addition, the multiple stage effect of having a plurality of holes at different levels, such as in a stair step type distributor, provides significant turndown and reduces the central trough height and the material required. Even where only a single stage is required in a liquid distributor, the employment of an extra multiple stage provides distribution when the first stage may be plugged.

The liquid distributor may be made simply and in a standardized method to reduce labor and material loss through the extrusion of a ceramic type distributor, the pultrusion of a fiberglass reinforced plastic or molding a plastic or milling out a graphite bar or simply bending and welding a sheet metal material to form a metal liquid distributor, all which reduce costs in manufacturing materials and drafting and enhances the availability of the liquid distributor by minimizing turn around time.

Particularly, the metal, multiple stage distributor design, such as the two stage design with a central trough, minimizes the amount of welding required, as the only welding required is with the two end plates with the central part of the distributor merely bent from sheet metal. For example, a metal liquid distributor of the invention containing two or more multiple step stages may be made by using a flat metal sheet of desired specifications and a punching type press, for example, to punch the desired holes, and thereafter placing the punches hole sheet material on a break to bend it on generally parallel lines into its finished shape, then merely welding on both end pieces to form a trough type distributor. The holes can be either punched as desired or may be drilled at any time during the process.

The fibergalss reinforced plastic type liquid distributor of the invention may be made by using a standard die where the basic shape is pultruded so that once the standard die is paid for, the cost of pultruded troughs is fairly low while the ends of the pultruded troughs may be secured in any manner, and the holes can be drilled to suit as desired. With a graphite type liquid distributor of the invention, a thick flat plate may be employed with the inside of the plate evacuated with an end mill to form the desired trough and the multiple stair steps and with the holes then drilled in the stair steps or the bottom of the trough to suit the particular requirements. Where a ceramic type liquid distributor is desired, the basic shape maybe easily extruded, and the approximate hole size may be punched out in the green stage of the clay or ceramic and where the end plates can be ware built. After the trials are dried and fired, the exact hole size can be reamed with a diamond drill bit. As can be seen, the liquid distributor of the invention may be composed of a wide variety of material and be prepared in a simple manufcaturing process at low cost and provides many advantages not provided by prior art liquid distributors.

The liquid distributor of the inveention may vary in design and construction and provides for a trough type container for the downwardly flowing liquid and also contains a plurality of holes at different levels of height from the lower section of the liquid distributor in order to permit the flow from at least one of the two levels. The number of levels may be three or four or more if desired. For example, in one embodiment, the liquid distributor may have a general V-shaped design with holes positioned at different elevations on one or both sides, preferably on both sides and preferably with the holes generally aligned horizontally along the sloped sides.

In another embodiment, the liquid distributor may comprise a generally rectangular liquid distributor with the plurality of stair steps, typically for example two ro more steps, and preferably the two steps with the stair steps on either side of a central trough, these steps being at the same or preferably different heights and the stair steps containing a plurality of holes therein with for example no holes in the general vertical wall of the distributor so that the flow is directed generally downwardly through the holes in the horizontal stair steps either generally perpendicular or at an angle to the axis of the distributor.

The size, diameter and shape of the holes employed may vary as desired to control the liquid turndown or the liquid flow rate of the downwardly flowing liquid. For example, the holes may be placed on one or more levels, typically aligned levels, on one or both sides of the V-shaped or rectangular shaped liquid troughs and positioned to permit the downward flow of liquid from the interior of the liquid distributor in the gas-liquid column to the packing below. The position of the holes may vary, but typically the holes are placed substantially uniformly along the substantial length of one or both sides of the liquid distributor.

The holes may vary in size and shape and generally are circular type holes which are easily drilled or punched and more particularly, the diameter of the holes generally is not over one inch or smaller than 1/16 inch and typically may range for example from $\frac{1}{8}$ to $\frac{1}{2}$ inch. The position of the holes also may vary and generally may range from as close as $\frac{1}{2}$ inch together to 4 to 6 inches or more apart, depending upon the design parameters of the liquid turn over desired. Generally, the holes are not placed in the vertical plane of the liquid distributors which of course would not include the angled plane of the V-shaped trough distributor and in a multiple stair step or two step rectangular type distributor with the stair steps placed on either side of a central trough, the holes would be on the horizontal surface of the stair of the trough where the holes are punched prior to or after bending. Generally, the holes will be circular and may have a generally peripheral recessed area, e.g. circular, about the hole which aids in directing high surface tension liquids, like water, into the hole and into a downward flow. Holes in the multiple stair step may be placed directly downward in the horizontal plane or at an angle so that the liquid would flow at a slight angle outwardly from the central trough. The holes may be recessed by a punch, for example, in the metal type liquid troughs or molded or milled in the ceramic and graphite troughs or otherwise formed so as to aid in the liquid flowing through the hole to prevent the plugging of residue materials or "gunk" in the hole.

The level of the holes from the bottom of the trough may vary and typically the holes need not be horizontally aligned at each level placed in alignment so that the height would range from not less than about one inch from the bottom of the trough section of the liquid distributor and generally not more than 12 inches and typically holes in each zone or alignment may be varied as desired. While the number of stair steps in each trough may vary, however, the increase in steps in the trough beyond two may not be desirable in that it spreads out the depth of the trough area and may restrict the upward flow of the gas so that in one embodiment, the V-shaped liquid distributor with two sets of levels or holes punched in either side and the rectangular type distributor with a central trough and two stair steps on either side are generally most desirable.

The liquid distributors may be used as a main trough distributor, but more typically are employed generally parallel to receive the flow from the main trough distributor in a gas liquid column. While the same height may be employed for example with the V-shaped or the stair step distributors for each level, however, the same height avoids some of the advantages of the multiple stair or the multiple height where the heights are at different levels. Typically, the bottom trough section of the liquid distributors serves as a bottom sump to collect residue from the downwardly falling liquid. However, if desired, a plurality of holes may be also placed in the bottom trough section.

In operation of a gas-liquid column, the liquid is introduced into the center of a main distribution trough and the liquid fills up in a trough and flows through the orifices and falls on the liquid distributors, hence to distribute the liquid throughout the cross sectional area of the gas-liquid tower. Downwardly flowing liquid fills up the trough and then flows out the first level of holes and thereafter the second level of holes as desired to control the liquid flow where the lower level of holes becomes plugged.

The invention will be described for the purposes of illustration only in connection with certain embodiment; however, it is recognized that various changes, modifications, additions and improvements may be made in those embodiments by those persons skilled in the art, all falling within the spirit and scope of the invention as described and illustrated.

BRIEF DESCRIPTION OF THE DRAWINGS

FIG. 1 is a schematic, illustrative, top plan view of gas-liquid contact column containing the liquid distributor of the invention;

FIG. 2 is a sectional view along lines 2—2 of FIG. 1 of one of the liquid distributors;

FIG. 3 is a sectional view of a ceramic or graphite liquid distributor of the invention;

FIG. 4 is a perspective, schematic view from above of the liquid distributor of FIGS. 1 and 2;

FIG. 5 is a perspective, fractional view from above of a V-shaped liquid distributor of the invention; and FIG. 6 is a sectional view of another embodiment of the liquid distributor of the invention having more than two levels.

DESCRIPTION OF THE EMBODIMENTS

FIG. 1 illustrates a gas-liquid contact tower system of the invention employing a gas-liquid contact tower 12 and having extending across the column 12 a predistributing means, such as a meter box 14 having a main liquid inlet 16 for discharging liquid into the meter box. A plurality of liquid distributors of the invention are illustrated as 18 and range generally parallel and immediately below the meter box 14 whereby the liquid introduced into inlet 16 and meter box 14 is introduced into each of the distributors 18 for distribution onto the top of a packing material 20 below the liquid distributors 18 in the gas-liquid column 12.

FIG. 2 is a sectional view of the liquid distributor 18 as shown in the FIG. 1 of a liquid distributor fabricated from a steel sheet material having generawlly upright, spaced apart paralllel walls 22 with a lower sump bottom section 24 to contain a generally flowing liquid and which contains a stair step 26 on one side of the central trough having a height H1 and a plurality of holes 32 punched therein with a generally circular area about the hole 32 while on the opposite side of the trough is a lower stair step 28 with a plurality of punched holes therein in a generally circular are thereabout at a height H2 from the lower section of the bottom sump 24. For example, in FIG. 2, H1 may range from 8 to 10 inches and H2 from 5 to 7 inches with the holes spaced about 2 to 3 inches apart and having a diameter of about ¼ inch and generally circular with about a 1 inch circular punched diameter there around each hole. For the purpose of illustration, the liquid 34 is illustrated in the liquid distributor 18 at a level such that the liquid will flow through both holes 32 and 30. However, it is recognized that where the liquid level would be below the level H1, then the downwardly flowing liquid would only flow from the hole 30. The liquid distributor 18 is easily formed by bending a sheet material along a series of generally parallel bend lines To form the stair steps and the sump horizontal surfaces and the upright wall surfaces 22. The plates 38 as illustrated more particularly in FIG. 4 may then be merely welded on to the ends to provide ease in manufacturing and standardization of design.

FIG. 3 is a cross section illustration of a liquid distributor similar to FIG. 2 except in slightly different form and prepared for example from extruding a ceramic type material having two different levels of height as illustrated by H1 and H2. Rather than having the holes punched, the holes 40 and 42 are performed or drilled in the material 36.

FIG. 5 is a schematic illustration of V-shaped metal liquid distributor having been composed of a sheet material bent in a "V" form with end plates on each end thereon to form a simple trough arrangement, the liquid distributor 44 having a lower sump area 46 and a plurality of generally aligned holes 48 on one side at one level and aligned holes 50 on the other side at a different level to permit the overflow of the liquid 52 contained therein from one or both levels depending on the level of the liquid in the distributor 44. This simplified V-type trough distributor can be easily formed by bending a sheet of metal annd before or after, typically before, punching the desired holes 48 and 50 in an aligned, uniformly spaced pattern throughout the sheet material and then welding on the end plates. If desired, the upper wall section of the V-shaped distributor 44 may be made as a generally parallel wall section so as to reduce any restriction in the upward flow of gas in the column.

FIG. 6 is an illustration of another embodiment of the liquid distributor of the invention formed for example from sheet material, the liquid distributor 56 comprising a cross section 60 and two stair steps 58 on either side of generally equal height and having a plurality of holes therein to permit the discharge of downwardly flowing liquid and then two stair steps, one on either side, of different height 62 and 64 wherein, as illustrated, a liquid 66 is employed which is discharged from the two equal stair steps 58 and form the lower height 62, but not from the upper emergency type 64. As the distributor in FIGS. 2 and 5, this distributor is easily formed by bending a sheet material and securing end plates thereto.

Multiple stage, such as a two stage, liquid distributor as illustrated can of course be prepared of other material, plastic, fiber reinforced plastic or more particularly graphite where corrosive gas-liquids are employed. For example, in the operation of gas-liquid column wherein corrosive type materials are employed, such as for example, an upwardly flowing halogen type gas, such as chlorine, and a downwardly flowing halogen-containing liquid, such as a liquid chlorine and a halo hydrocarbon, such as carbon tetrachloride, a graphite type liquid distributor formed with stair steps on either side of the central trough may be prepared by milling out a graphite bar to form the stair steps and drilling in the desire holes.

The liquid distributor of the invention therefore provides for a sump where "gunk" or other material may be collected as desired, which provides for a multiple level of holes. To avoid the plugging of one level of holes, multiple stage holes at different levels provide signifcant turn down and reduces the trough height, and even where a single stage is desired, the extra stage provides distribution when the first stage is plugged or tends to become plugged. The liquid distributors, as illustrated, are easily and quickly manufactured to reduce the cost and labor and permit a standarized design with rapid turn around time.

What is claimed is:

1. A high efficiency trough distributor for use in a gas-liquid contact column to distribute a downwardly flowing liquid generally uniformly across a cross sectional area of the contact column and to permit the passage of an upwardly flowing gas, which trough distributor comprises:

generally upright side walls to define a trough to contain liquid to be distributed, the trough having an upper section and a lower sump section with a bottom surface, the trough having first and second stair steps therein the stair steps are at different height levels from the bottom surface of the sump section, the stair steps having a plurality of holes therein to permit the downward flow of liquid from the trough, the number, position and size of said holes selected to control the turndown of the gas-liquid column.

2. The distributor of claim 1 wherein the trough distributor comprises a generawlly V-shaped trough.

3. The distributor of claim 1 wherein the trough comprises a generally rectangular sectional trough having a rectangular bottom sump section.

4. The distributor of claim 1 wherein the first and second stair steps in the trough are positioned respectively on the one and the other side of the trough.

5. The distributor of claim 1 wherein the said holes are generally uniformly distributed in a generally horizontal spacing of from about ½ to 4 inches apart along the substantial length of the stair steps of the trough.

6. The distributor of claim 1 wherein the size of said holes varies from about 1/16 to one inch in diameter.

7. The distributor of claim 1 wherein the height level from the bottom surface of the lower sump section of the trough to the stair steps ranges from about 1 to 12 inches.

8. The distributor of claim 1 wherein the lower sump section has a plurality of holes therein to permit the downward flow of liquid contained in the lower sump section of the trough.

9. The distributor of claim 1 wherein all of said holes are positioned in the stair steps of the trough and no holes are positioned in the upright, vertical walls of the trough.

10. The distributor of claim 1 wherein said holes are circular holes and which contain a small recessed are about said holes.

11. The distributor of claim 1 which includes a trough with third and fourth stair steps each having a plurality of holes with the first and second stair steps on one side of the trough.

12. The distributor of claim 11 wherein all the stair steps are at different height levels from the bottom surface of the lower sump section and two stair steps are on each side of the trough.

13. The distributor of claim 1 which comprises a generally rectangular block of ceramic or graphite with the first and second stair steps respectively on either side of the trough and said holes extending from the first and second stair steps through the ceramic or graphite material to the bottom surface of the distributor.

14. A gas-liquid contact tower which contain a plurality of the distributors of claim 1.

15. A high efficiency stair step trough distributor for use in a gas-liquid contact column to distribute a downwardly flowing liquid generally uniformly across a substantial cross sectional area of the contact column and to permit the passage of an upwardly flowing gas, which trough distributor comprises:

(a) a trough liquid distributor means which comprises a trough having an open top section and at least first and second pairs of uprights, generally parallel, spaced apart side walls and at least two horizontal stair steps to form at least two stair steps in the trough distributor means and a bottom section connected by at least two side walls to form a bottom sump section to contain a liquid therein; and (b) a plurality of holes in the stair steps to permit the downward flow of liquid in the trough where the liquid extends above the level of the stair steps, the number and size of said holes in the height of the stair steps so selected to control the liquid turndown and liquid flow in the gas-liquid column.

16. The distributor of claim 15 wherein the stair steps of the trough distributor means are generally uniform in height and are positioned respectively on one and the other side of the bottom sump section.

17. The distributor of claim 15 wherein the stair steps of the trough distributor means are generally of uniform width and on either side of the bottom sump section and the stair steps are placed at different levels of height from the bottom section.

18. The distributor of claim 15 wherein said holes are circular and are surrounded by a small, generally circular, recessed, punched area.

19. The distributor of claim 15 wherein said holes range from about 1/16 to one inch iin diameter, and the level of height of stair steps in the trough distributor means ranges from about 1 to 12 inches above the height of the bottom section.

20. The distributor of claim 15 which comprises a solid distributor of generally rectangular, cross sectional shape with said holes extending from the stair steps through the solid material to the bottom surface of the distributor.

21. A gas-liquid contact column which contains a plurality of the high efficiency stair steps distributors of claim 15.

22. A trough distributor for use in a gas-liquid contact column to distribute a downwardly flowing liquid generally uniformly about a cross sectional area of the contact column which distributor comprises:

a V-shaped trough distributor having upward, V-shaped, extending side walls and a V-shaped bottom section and plurality of holes in said side walls to permit the downward flow of liquid from said holes, the said holes generally aligned on the one and the other of the side walls and the aligned holes on one side at a different height from the bottom section than the holes on the other side of the side wall to control the liquid turndown in the column.

23. In a method for the distribution of a downwardly flowing liquid in a gas-liquid contact column and to permit the upward flow of a gas in said gas-liquid column, which method comprises:

(a) introducing a downwardly flowing liquid into a liquid distributor in the gas-liquid column;

(b) discharging the liquid from the holes in the liquid distributor, the improvement which comprises:

distributing the liquid from one or more distributors having at least two horizontal stair steps therein and from a plurality of holes in each stair step in each distributor, the size and number of said holes and the height of the holes selected to control the liquid turndown of the gas-liquid contact column.

24. The method of claim 23 which includes employing a multiple stair step distributor with first and second stair steps, one on either side of a central bottom sump section, to contain a liquid and which method comprises placing the plurality of said holes in each of the stair steps, the stair steps at different levels of height from the bottom of the liquid distributor and flowing the liquid over one or more of the stair steps depending upon the height of liquid and the downwardly flowing liquid in the distributor.

25. The method of claim 23 which includes placing a plurality of holes in the bottom sump section of the distributor and flowing liquid through said holes from the bottom sump section.

26. A method of making a multiple level distributor for use in a gas-liquid contact column, which method comprises:

(a) bending a sheet material along six generally parallel lines to form a multiple stair step trough-type distributor having a lower sump section and at least two stair steps of different levels of height from the bottom of the sump section;

(b) securing end plates to the end of the bent sheet material to form an enclosed trough-type distributor to contain a downwardly flowing liquid; and (c) placing a plurality of holes in the stair steps, the number and size of the holes and the height of the stair steps selected to control the liquid turndown and the liquid flow in the gas-liquid contact column.

27. The method of claim 26 which includes punching the said plurality of holes in the generally horizontal stair steps to provide a generally circular hole surrounded with a generally circular, punched, recessed area about the hole.

28. The method of claim 27 which includes bending the sheet material to form stair steps on either side of a centeral bottom sump section and welding and securing generally rectangular panels at each end of the bent sheet material to form the enclosed trough-type distributor.

* * * * *

UNITED STATES PATENT AND TRADEMARK OFFICE
CERTIFICATE OF CORRECTION

PATENT NO. : 4,994,210

DATED : February 19, 1991

INVENTOR(S) : Bernardo Y. Lucero et al

It is certified that error appears in the above-identified patent and that said Letters Patent is hereby corrected as shown below:

On the title page:

[75] Inventors: After "Akron" delete "," and insert --; Phillip J. Herman, Cuyahoga Falls, all of Ohio; Neil Yeoman, Merrick, NY Claim 2, col. 7, line 29, delete "generawlly" and insert --generally--.

Claim 19, col. 8, line 40, delete "iin" and insert --in--.

Signed and Sealed this

Twenty-second Day of September, 1992

Attest:

DOUGLAS B. COMER

Attesting Officer

Acting Commissioner of Patents and Trademarks

UNITED STATES PATENT AND TRADEMARK OFFICE
CERTIFICATE OF CORRECTION

PATENT NO.   : 4,994,210
DATED        : February 19, 1991
INVENTOR(S)  : Bernardo Y. Lucero et al.

It is certified that error appears in the above-identified patent and that said Letters Patent is hereby corrected as shown below:

<u>Title page,</u>
Item [75], Inventors, after "Akron", delete "," and insert -- ; Phillip J. Herman, Cuyahoga Falls, all of Ohio; Neil Yeoman, Merrick, NY --

Signed and Sealed this

Twenty-third Day of December, 2003

JAMES E. ROGAN
*Director of the United States Patent and Trademark Office*